Feb. 11, 1958 P. V. MALLOY 2,822,664
PROJECTILE ACTUATED POWER GENERATOR
Filed Nov. 1, 1954 2 Sheets-Sheet 2

INVENTOR.
PAUL V. MALLOY
BY Hudson, Boughton,
Williams, David & Hoffman
ATTORNEYS

United States Patent Office 2,822,664
Patented Feb. 11, 1958

2,822,664

PROJECTILE ACTUATED POWER GENERATOR

Paul V. Malloy, Lakewood, Ohio

Application November 1, 1954, Serial No. 466,055

13 Claims. (Cl. 60—1)

This invention relates to power generating devices and, as one of its objects, aims to provide a simple and practical power device by which a driving force or torque of substantial magnitude can be delivered by the conversion of the kinetic energy of explosive-charge-propelled solid projectiles into mechanical energy.

The power device of this invention can be used to drive various kinds of apparatus but is especially useful for engine starting purposes and other applications where a high torque output is desirable during a relatively short time interval. This power device fulfills these requirements and provides an immediately available power output, regardless of the existence of arctic temperatures or other unfavorable circumstances or weather conditions.

Another object is to provide a power device comprising rotor means having a power take-off and adapted to be driven by the delivery of solid bodies or projectiles against the rotor means substantially tangentially thereof.

A further object is to provide a power device of the kind mentioned above in which the rotor means comprises a pair of rotors having cooperating peripheral portions defining a through passage between the rotors adapted to be traversed by the projectiles, the through passage preferably being defined by cooperating circumferential peripheral grooves in the rotors.

Still another object is to provide a power generator comprising such a pair of rotors having cooperating peripheral portions defining a through passage between the rotors, and projector means operable to deliver a velocity stream of solid bodies or projectiles into the through passage in driving contact with the rotors, the projectiles preferably being of a relatively soft metal so as to be conformable to the cross-sectional shape of the through passage.

Yet another object is to provide a power generator of the character above indicated in which the projector means is of the explosive-charge firearm type and in which the projector means is readily disengageable from the portion of the device which contains the rotor means.

Other objects and advantages of this invention will be apparent in the following detailed description and in the accompanying sheets of drawings forming a part of this specification and in which:

Fig. 3 is a fragmentary transverse vertical section corresponding with a portion of Fig. 1, but showing such portion on a somewhat larger scale.

Figure 1:
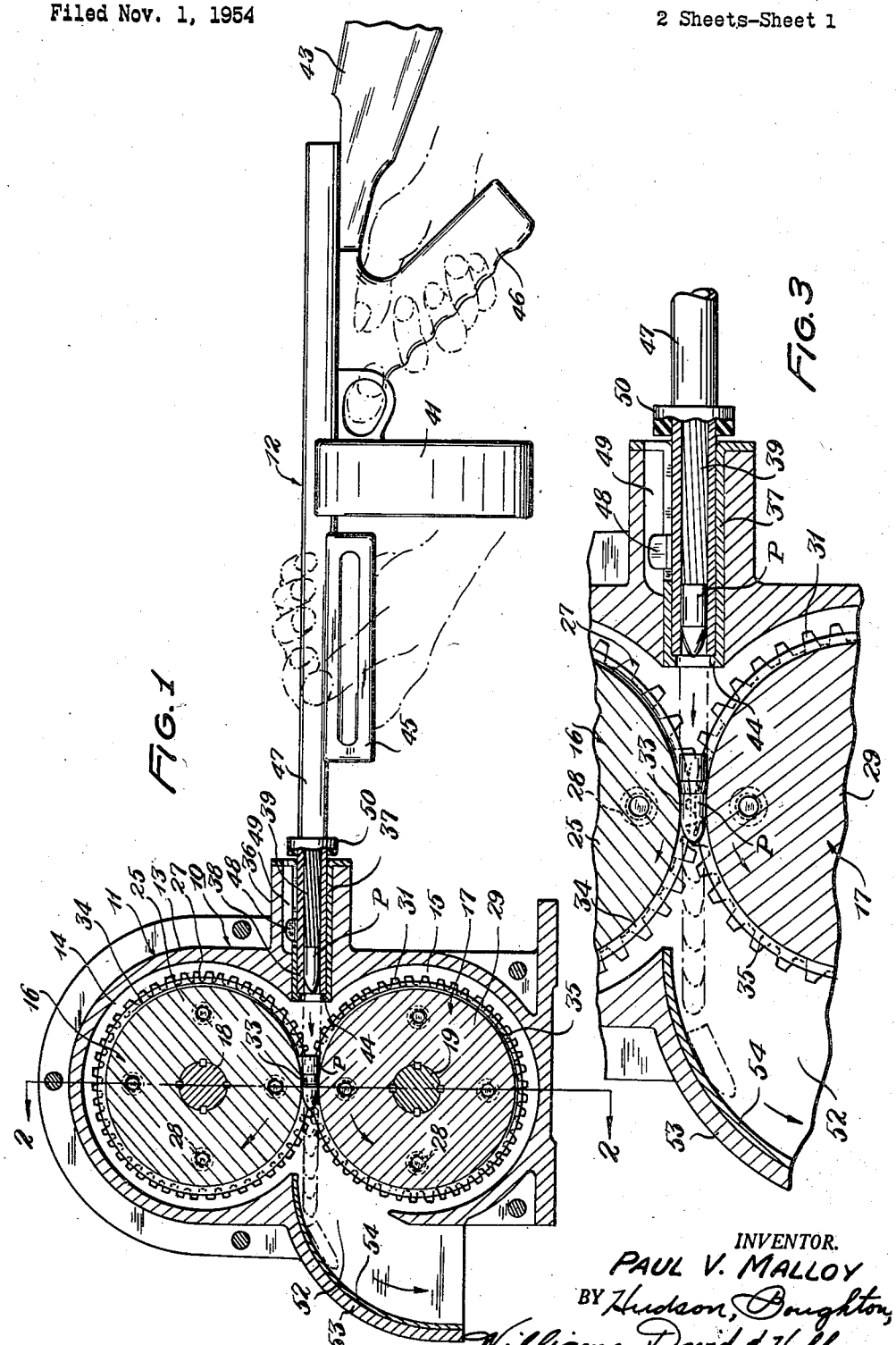
Fig. 1 is an elevational view of the power device with a portion thereof shown in vertical section as indicated by the section line 1—1 of Fig. 2.
Figure 2:
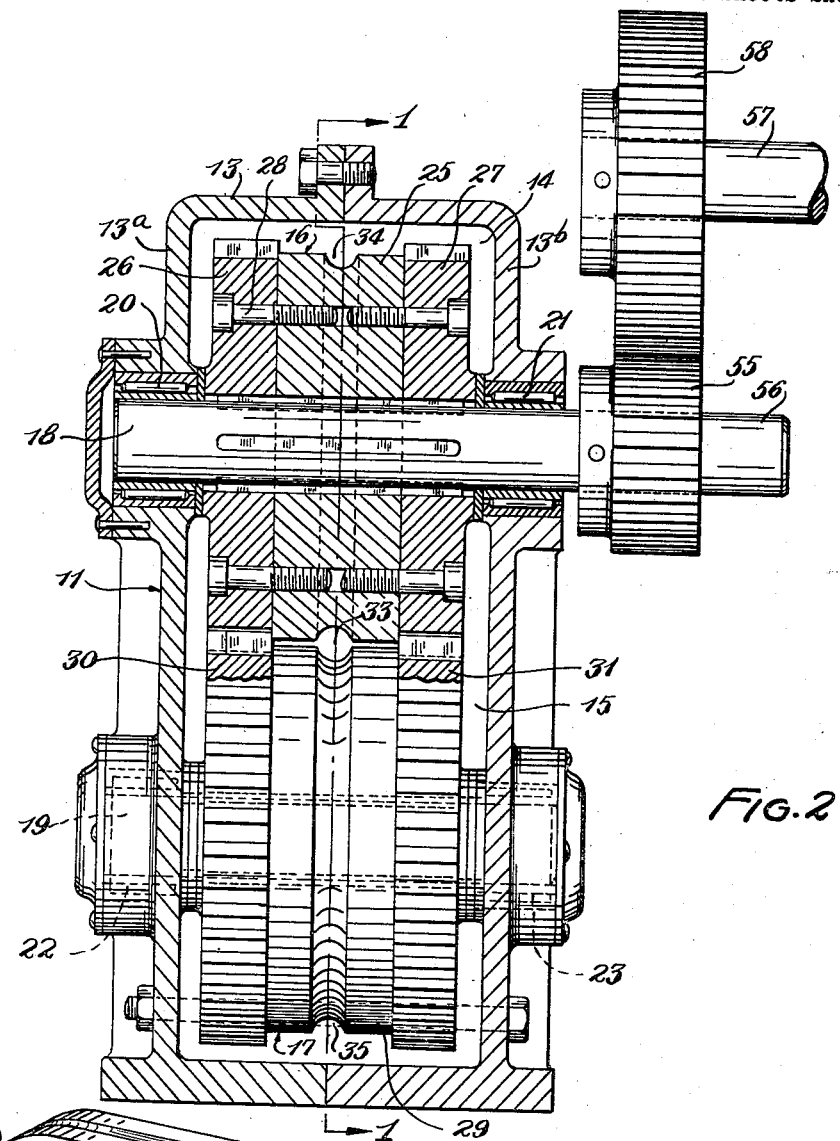
Fig. 2 is a transverse vertical section taken through the rotor unit on section line 2—2 of Fig. 1.

The novel power unit 10 comprises, in general, a rotor unit 11 operable to convert the kinetic energy of high-velocity solid bodies or projectiles P into mechanical energy or torque, and a projector unit or gun 12 operable to deliver the high-velocity solid bodies or projectiles into the rotor unit.

The rotor unit 11 comprises a suitable housing 13 formed of connected housing sections 13$^a$ and 13$^b$ containing rotor chambers 14 and 15, and a pair of cooperating rotors 16 and 17 operable in such rotor chambers. The rotors 16 and 17 can be of any suitable construction and are rotatable about substantially parallel rotation axes provided by the shafts 18 and 19 on which the respective rotors are secured. The rotor shaft 18 is supported for rotation by suitable bearings 20 and 21 of the housing sections 13$^a$ and 13$^b$. The rotor shaft 19 is mounted for rotation in the housing 13 by similar bearings 22 and 23.

The rotor 16 comprises a substantially cylindrical center section 25, and a pair of end sections 26 and 27 in the form of spur gears which are located on opposite sides of the center section and secured thereto as by means of the screws 28. The rotor 17, likewise, comprises a substantially cylindrical center section 29, and a pair of end sections 30 and 31 in the form of spur gears which are located on opposite sides of such center section and suitably secured thereto. The spur gear sections 26 and 27 of the rotor 16 are in meshing engagement with the spur gear sections 30 and 31 of the rotor 17.

The rotors 16 and 17 are located in the housing 13 with portions of their peripheries in adjacent relation, such that a space 33 remaining therebetween defines a through passage between the rotors to be traversed by the solid bodies or projectiles P. As here shown, the through passage 33 is preferably of a substantially circular cross-sectional shape and is formed by cooperating circumferentially extending half-round peripheral grooves 34 and 35 formed in the center sections 25 and 29 of the rotors 16 and 17. As will be seen from the drawings, this through passage 33 extends between the rotors 16 and 17 substantially tangentially of the outer peripheries thereof. The grooves 34 and 35 can be of a cross-sectional shape other than the half-round shape mentioned above or can be omitted entirely, if desired.

As shown in Figs. 1 and 3, the housing 13 is provided, on one side of the cooperating rotors 16 and 17, with a hollow projection 36 having therein an adapter sleeve 37 whose inner end is disposed in adjacently spaced relation to one end of the through passage 33. The projection 36 and sleeve 37 are preferably located such that their common axis is coincident with the axis of the through passage 33 or, in other words, extends between the rotors 16 and 17 in a direction substantially perpendicular to a common plane passing through the axes of the rotor shafts 18 and 19. The adapter sleeve 37 is adapted to receive the discharge end or muzzle 38 of the gun 12 and aligns the projectile delivery passage or rifled bore 39 of the latter with the through passage 33 of the rotor unit 11 in the relation just explained above, such that projectiles P will be directed into the through passage and will engage the rotors 16 and 17 substantially tangentially thereof to drive the same.

The projector unit or gun 12 can be of various forms of construction but is here shown as being of the explosive-charge-detonating or firearm type operable to deliver bullet-shaped projectiles through a substantially uniform-size gun bore. In this instance, the gun 12 is represented as being a rapid-fire gun of the manually portable type having a conventional breech and firing mechanism and a magazine 41 adapted to contain a supply of cartridges of the kind in which the projectiles P form a disengageable single-use expendable part commonly referred to as a bullet. The gun 12 is also shown as having a conventional stock 43 engageable with the shoulder of a person holding such gun and by which the muzzle 38 can be firmly held in the adapter sleeve 37 with the end of the muzzle engaged against an internal annular shoulder 44 provided on such sleeve adjacent the inner end thereof. The gun 12 is also shown as having conventional hand grip members 45 and 46 thereon.

When the projector unit is of the firearm type just described and the barrel 47 thereof carries a front sight 48, the adapter sleeve 37 and the hollow projection 36 are provided with a longitudinal slot 49 extending axially thereinto to accommodate such front sight. The gun 12 is here shown as also having a suitable packing member 50, such as an elastic ring or collar disposed around the barrel 47 thereof and slidable on such barrel into engagement with the outer end of the adapter sleeve 37. The packing 50 serves as a flare-back guard to prevent gases or powder particles from being discharged backwardly from the adapter sleeve 37 in the event that the muzzle 38 of the gun is only loosely engaged therein. The guard 50 also serves as a deflector for any such gases or powder particles in the event of their backward discharge through the adapter sleeve 37.

The housing 13 is provided on the other side of the rotors 16 and 17, that is on the side opposite to the gun side, with an outlet space or discharge passage 52 with which the through passage 33 communicates and through which the projectiles P are discharged from the housing after traversing the through passage. The discharge passage 52 is here shown as being a downwardly curved passage through which the spent projectiles can be directed toward the ground or floor so as to prevent such projectiles from causing personal injury or property damage.

The discharge passage 52 is defined, in part, by a plate portion 53 of the housing 13 which extends in angular relation to the axis of the through passage 33 so as to constitute an impact plate or ricochet member against which the projectiles P will impinge upon emerging from the through passage 33 and by which they will be deflected downwardly toward the ground or floor. The deflector plate 53 is preferably provided on the inner surface thereof with a suitable lining material 54 such as a relatively hard or wear-resistant material, which will facilitate such downward deflection of the projectiles P and will prevent penetration of the deflector by such projectiles.

The projectiles P are preferably of a relatively soft material, such as lead, so as to be conformable to the cross-sectional shape of the through passage 33 to insure free travel of the projectiles through that passage and yet provide a good driving engagement of the projectiles with the rotors 16 and 17. By reason of this relatively soft and deformable characteristic of the projectiles, the through passage can be formed with a diameter equal to, or even slightly smaller than, the diameter of the projectiles to further insure such good driving engagement of the projectiles with the rotors. As shown in the drawings, the projectiles or bullets P are of a shape comprising an elongated substantially cylindrical body having a tapered or pointed forward end.

As has already been mentioned above, the power device 10 can be used to convert the kinetic energy of high-velocity solid bodies, such as the projectiles P which are being delivered in a stream into the through passage 33, into useful mechanical energy or torque. Such a stream of high-velocity solid projectiles being delivered into the through passage 33 for a relatively short interval of time will effectively drive the rotors 16 and 17 in a manner to provide for the delivery of a high value of torque during such short interval of time and which torque can be used for engine starting purposes or various other auxiliary uses.

The power device 10 can be readily applied to the engines of airplanes, either as a part of the original equipment or as an adapter device, for use on such airplanes for starting the engines thereof when starting conditions are hazardous or difficult, such as in arctic regions. The gun 12 can be built into the power device 10 if desired, or can be of a type which is readily available to military and civil personnel and which can be conveniently carried in the airplane or other vehicle on which the power device is being used.

Figure 4:
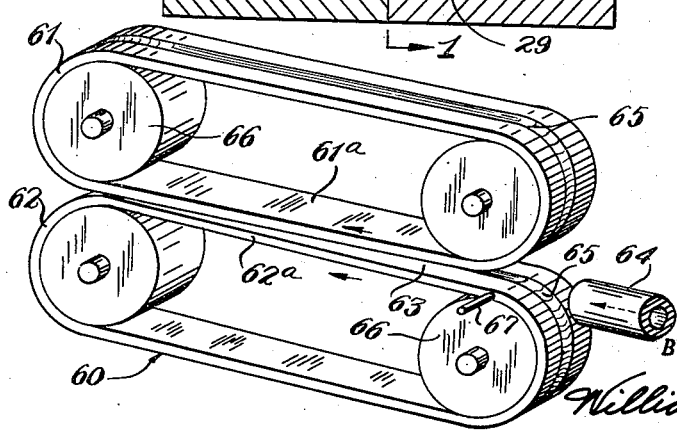
Fig. 4 is a perspective view of a somewhat diagrammatic type showing a modified form of this power device.

Fig. 4 of the drawings shows a modified form of power generator 60 in which the rotor means comprises endless tread members or belts 61 and 62 having reaches 61ᵃ and 62ᵃ thereof in adjacent relation for defining a longitudinally convergent through passage 63 into which solid velocity-bodies or projectiles are delivered by a suitable projector or gun 64. The belts can be of the caterpillar tread type, or of other flexible construction, and preferably have longitudinal grooves 65 in their adjacent surfaces for defining a through passage which will be of a desired cross-sectional shape. With the length and taper angle of the through passage 63 suitably related to the size and velocity of the projectiles, substantially all of the useful energy of the projectiles can be extracted therefrom.

The power take-off of the modified power device 60 can be a rotary drive means connected with the shaft of one of the belt-supporting pulleys or sprockets 66, but preferably, the power take-off is a lateral drive projection or pin 67 on one of the belts by which a longitudinal power thrust can be delivered to a device desired to be driven, such as a catapult for aircraft launching or other purposes.

For the accomplishment of the above-explained power delivery purposes, the rotor unit 11 is provided with a suitable power take-off which is here shown as comprising a drive pinion 55 fixed on a shaft projection 56 of the rotor shaft 18. The drive pinion 55 can be engaged directly with a flywheel gear, or other member to be driven, or can be connected with the load through a delivery shaft 57 having a gear 58 fixed thereon and in meshed engagement with the drive pinion.

From the accompanying drawings and the foregoing detailed description, it will now be readily understood that this invention provides a power device comprising a rotor unit having a through tangential passage, and a projector unit operable to deliver high-velocity solid bodies or explosive-charge-propelled projectiles into such through passage for driving a rotor means and converting the kinetic energy of the solid bodies into mechanical energy or torque. In addition to the advantages already explained herein, it is pointed out that the power device is of a relatively inexpensive and durable construction which will require substantially no servicing or attention for maintaining the same in an efficient operating state, regardless of changing weather conditions or the existence of adverse circumstances or environments. Moreover, this power device is instantly ready for operation for the delivery of a high value of torque during a short time interval of operation and requires no skilled personnel, but can be operated satisfactorily by anyone capable of using firearms.

Although the novel power device of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. A power generator comprising, paired conjointly movable members having cooperating portions thereof located in a substantially opposed spaced-apart relation, said portions, and at least a portion of the space therebetween, defining a through passage between said members and extending in the general direction of the conjoint movement of said members, and explosive-charge-detonating projector means operable to deliver solid velocity-bodies into said through passage in driving engagement with said members, said projector means having a delivery bore of a generally uniform transverse size in substantially coaxial alignment with said through passage, said velocity bodies being elongated bullet-shaped preformed solid bodies endwise movable through said bore and passage.

2. A power device of the character described comprising, a pair of rotors rotatable about substantially parallel axes and having portions of their peripheries in adjacent relation, said rotors having peripheral grooves extending circumferentially therearound and cooperating to define a through passage between the rotors, and projector means of the explosive-charge-propelled solid-projectile type operable to deliver preformed solid projectiles through said passage for driving said rotors.

3. A power device as defined in claim 2 in which said projectiles comprise a metal of a softness such that the projectiles are conformable to the cross-sectional shape of said through passage.

4. In a power device of the character described, a pair of peripherally grooved rotors rotatable about substantially parallel axes with the peripheral grooves cooperating to define a through passage between the rotors substantially tangentially thereof, and means defining a propellent passage in adjacent substantially aligned relation to said through passage for directing preformed solid velocity projectiles into the latter for driving engagement with said rotors, said propellent passage being a gun bore and said projectiles being elongated bodies movable endwise through said bore and passage.

5. In a power device of the character described, a pair of peripherally grooved rotors rotatable about substantially parallel axes with the peripheral grooves cooperating to define a through passage between the rotors substantially tangentially thereof, explosive-charge detonating means on one side of said rotors including a bore in adjacent substantially aligned relation to one end of said through passage for directing bullet-shaped preformed solid velocity projectiles into the latter, and means on the opposite side of said rotors and defining an impact surface adapted to be impinged by the projectiles traversing said through passage.

6. A power device as defined in claim 5 in which said impact surface is disposed in inclined relation to said through passage and constitutes a deflector for deflecting the projectiles impinging thereagainst.

7. A power device of the character described comprising, a pair of rotors rotatable about substantially parallel axes and having portions of their peripheries in adjacent relation, said rotors having peripheral grooves extending circumferentially therearound and cooperating to define a through passage between the rotors, means defining a socket in adjacent substantially aligned relation to one end of said through passage, and a firearm device of the rapid-fire solid-projectile-delivery type having the muzzle thereof removably engaged in said socket, said firearm device having a bore opening through said muzzle for directing preformed solid projectiles into said passage.

8. A power cranking device for engines or the like comprising, a housing, a pair of rotors in said housing and rotatable about substantially parallel axes, gear means connecting said rotors, power take-off means driven by one of said rotors and adapted for driving connection with the engine or the like to be cranked, said rotors having peripheral grooves extending circumferentially therearound and cooperating to define a through passage between the rotors, and gun means of the explosive-charge solid-projectile-delivery type having a projectile delivery bore disposed relative to said through passage for directing preformed solid projectiles into the latter for driving said rotors.

9. A power generator comprising, a pair of belt members having conjointly movable endless peripheral portions in adjacent relation, said peripheral portions having cooperating grooves therein defining a through passage between said members, and explosive-charge detonating means operable to deliver high-velocity preformed solid bodies into said through passage in driving engagement with said members.

10. A power generator comprising, a pair of belt members having conjointly movable adjacent reaches, portions of said reaches being in a substantially opposed spaced-apart relatively inclined relation refining a longitudinally convergently tapered passage therebetween, and projector means operable to deliver high-velocity solid bodies into said passage in the direction of the taper convergence and in driving engagement with said reaches.

11. A power device comprising, a pair of belt members having conjointly movable adjacent reaches, portions of said reaches being in a substantially opposed spaced-apart relatively inclined relation defining a longitudinal passage therebetween, projector means operable to deliver solid velocity-bodies into said passage in driving engagement with said reaches, and power take-off means on one of said belt members and engageable with a member to be driven for imparting a longitudinal movement to the latter.

12. A power generator comprising, a rotor having an annular peripheral groove therein, a cooperating member disposed opposite the periphery of said rotor and spanning said groove, the portion of said groove spanned by said members defining a through passage between said rotor and member, and projector means operable to deliver explosive-charge-propelled bullet-shaped solid bodies into said through passage and in propelling engagement with the grooved portion of said rotor.

13. A power device of the character described comprising, a pair of rotors rotatable about substantially parallel axes and having substantially tangentially cooperating portions of their peripheries in a spaced-apart substantially opposed relation defining a through passage extending between said rotors substantially tangentially thereof, and projector means of the explosive-charge detonating type operable to deliver a velocity stream of preformed solid bodies into said passage and in propelling engagement with said cooperating portions of said rotors.

References Cited in the file of this patent

UNITED STATES PATENTS

| | | |
|---|---|---|
| 113,417 | Gilbert | Apr. 4, 1871 |
| 546,688 | Vojacek | Sept. 24, 1895 |
| 923,680 | Meyersberg | June 1, 1909 |
| 962,511 | Kincaid | June 28, 1910 |
| 1,678,047 | Johnston | July 24, 1928 |
| 2,132,148 | Davis | Oct. 4, 1938 |
| 2,164,700 | Coffman | July 4, 1939 |

FOREIGN PATENTS

| | | |
|---|---|---|
| 10,609 | Great Britain | Apr. 28, 1897 |
| 16,079 | Great Britain | July 21, 1896 |